(12) United States Patent
Liu et al.

(10) Patent No.: US 9,765,615 B2
(45) Date of Patent: Sep. 19, 2017

(54) OPTIMIZING ELECTROMAGNETIC TELEMETRY TRANSMISSIONS

(71) Applicant: EVOLUTION ENGINEERING INC., Calgary (CA)

(72) Inventors: Jili Liu, Calgary (CA); Mingdong Xu, Calgary (CA); Aaron W. Logan, Calgary (CA); David A. Switzer, Calgary (CA); Monica E. Varga, Calgary (CA); Mojtaba Kazemi Miraki, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 14/914,050

(22) PCT Filed: Aug. 28, 2014

(86) PCT No.: PCT/CA2014/050825
§ 371 (c)(1),
(2) Date: Apr. 21, 2016

(87) PCT Pub. No.: WO2015/027340
PCT Pub. Date: Mar. 5, 2015

(65) Prior Publication Data
US 2016/0201455 A1    Jul. 14, 2016

Related U.S. Application Data

(60) Provisional application No. 61/870,968, filed on Aug. 28, 2013.

(51) Int. Cl.
*H04W 52/02* (2009.01)
*E21B 47/12* (2012.01)
(Continued)

(52) U.S. Cl.
CPC .......... *E21B 47/122* (2013.01); *E21B 47/121* (2013.01); *H04Q 9/00* (2013.01);
(Continued)

(58) Field of Classification Search
CPC .......... H04W 52/028; H04W 52/0245; H04W 52/241; H04W 52/245; H04Q 9/00; E21B 47/121
See application file for complete search history.

(56) References Cited

U.S. PATENT DOCUMENTS

| 4,739,325 A | 4/1988 | MacLeod |
| 5,124,953 A | 6/1992 | Grosso |

(Continued)

FOREIGN PATENT DOCUMENTS

| CA | 2259853 C | 8/1999 |
| CA | 2588059 C | 6/2010 |

(Continued)

*Primary Examiner* — Leon Flores
(74) *Attorney, Agent, or Firm* — Oyen Wiggs Green & Mutala LLP

(57) ABSTRACT

An electromagnetic telemetry system adjusts telemetry parameters which may include carrier frequency, signal amplitude and/or data encoding protocol to achieve reliable data transmission and to conserve power. In some embodiments, sweep signals transmit a range of carrier frequencies and the parameters are determined in part by analyzing the received sweep signals. In some embodiments, different parameters are selected automatically based on a mode of drilling.

50 Claims, 4 Drawing Sheets

(51) Int. Cl.
*H04Q 9/00* (2006.01)
*H04W 52/24* (2009.01)
*H04B 17/318* (2015.01)
*H04B 17/336* (2015.01)

(52) U.S. Cl.
CPC ..... *H04W 52/028* (2013.01); *H04W 52/0245* (2013.01); *H04B 17/318* (2015.01); *H04B 17/336* (2015.01); *H04W 52/241* (2013.01); *H04W 52/245* (2013.01); *Y02B 60/50* (2013.01)

(56) References Cited

U.S. PATENT DOCUMENTS

| | | |
|---|---|---|
| 5,148,408 A | 9/1992 | Matthews |
| 5,160,925 A | 11/1992 | Dailey et al. |
| 6,750,783 B2 | 6/2004 | Rodney |
| 7,453,372 B2 | 11/2008 | Hentati et al. |
| 8,179,278 B2 | 5/2012 | Shakra et al. |
| 8,242,928 B2 | 8/2012 | Prammer |
| 8,284,075 B2 | 10/2012 | Fincher et al. |
| 8,408,331 B2 | 4/2013 | Patwa et al. |
| 2004/0004553 A1 | 1/2004 | Rodney |
| 2009/0316528 A1* | 12/2009 | Ramshaw ............ E21B 44/00 367/83 |
| 2012/0250461 A1 | 10/2012 | Millot et al. |
| 2013/0106615 A1 | 5/2013 | Prammer |
| 2013/0342354 A1 | 12/2013 | Petrovic et al. |
| 2014/0266769 A1 | 9/2014 | Van Zelm |

FOREIGN PATENT DOCUMENTS

| | | |
|---|---|---|
| EP | 1035299 A2 | 9/2000 |
| EP | 1953570 B1 | 8/2008 |
| GB | 2346509 A | 8/2000 |
| GB | 2458395 B | 11/2009 |
| GB | 2478477 B | 2/2013 |
| WO | 2004005966 A1 | 1/2004 |
| WO | 2009076338 A2 | 6/2009 |
| WO | 2010069623 A1 | 6/2010 |
| WO | 2010121345 A1 | 10/2010 |
| WO | 2012131600 A2 | 10/2012 |
| WO | 2014085936 A1 | 6/2014 |
| WO | 2014100264 A1 | 6/2014 |
| WO | 2014146207 A1 | 9/2014 |

\* cited by examiner

OPTIMIZING ELECTROMAGNETIC TELEMETRY TRANSMISSIONS

TECHNICAL FIELD

This application relates to subsurface drilling, specifically to methods and apparatus for communicating data to and from downhole equipment by electromagnetic telemetry. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electro-mechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole probe is typically suspended in a bore of a drill string near the drill bit.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

Telemetry data may include data regarding a current orientation of a drill bit (sometimes called "tool face" data). Telemetry information may include data retrieved from sensors which monitor characteristics of the formations surrounding the wellbore ("logging" data). Telemetry information may include information regarding the drilling itself (e.g. information regarding downhole vibration, characteristics of the wellbore being drilled, flow rate of drilling fluid, downhole pressure and the like).

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM telemetry system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe.

As EM transmissions are strongly attenuated over long distances through earth formations, EM telemetry can have the disadvantage of undesirably short range. Also, EM telemetry can require a relatively large amount of electrical power, especially where one is attempting EM telemetry from a deep wellbore or from within a formation that has relatively high electrical conductivity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a BHA such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that encodes information for transmission to the surface. Low frequencies are used because higher frequency signals are attenuated much more strongly than low frequency signals. The electromagnetic signals may be detected at the surface, for example by measuring electrical potential differences between the drill string or a metal casing that extends into the ground and one or more ground rods.

There is a demand for reliable and effective telemetry. There is a particular need for high performance EM telemetry systems.

SUMMARY

This invention has a number of aspects. One aspect provides methods for EM telemetry. Some such methods include dynamically adjusting the carrier frequency and/or signal amplitude of EM telemetry signals to achieve performance goals. The performance goals may, for example, include one or more of a desired data rate and a desired power consumption. Another aspect provides EM telemetry systems and their components. For example, one aspect provides a controller for an EM telemetry system. Another aspect provides a downhole EM telemetry unit. Another aspect provides a complete EM telemetry system. Another aspect provides a drill string comprising a plurality of downhole EM telemetry systems.

An example aspect provides a method for downhole electromagnetic (EM) telemetry in a downhole drilling operation. The method comprises sending a set of EM sweep signals from a downhole EM telemetry system located at a downhole location to an uphole system located at a surface location. The set of EM sweep signals includes signals of a plurality of different frequencies. The method determines whether each of the EM sweep signals is received at the uphole system and, for the EM sweep signals received, measures parameters of the received EM sweep signals. The parameters comprise at least one of signal strength and signal-to-noise-ratio. Based at least in part on the EM sweep signals received and the parameters measured, the method determines a protocol for downhole data transmission, the protocol specifying protocol parameters including one or more of signal frequency, signal amplitude, and data encoding scheme; and configures the downhole EM telemetry system to transmit data to the uphole system using the protocol.

In some embodiments, the data encoding scheme comprises a number of cycles of EM signals to use for encoding symbols for transmission; and determining the protocol comprises setting the number of cycles to be used for encoding signals for transmission.

In some embodiments, the method comprises determining a mode of the drilling operation and determining the protocol based at least in part on the mode of the drilling operation. For example, different protocols may be used depending on whether the wellbore is quiet (no flow and no rotation of the drill string), operating in a sliding mode (flow on but no or limited rotation of the drill string), or operating in a full on drilling mode (flow on and the drill string is rotated from the surface). In some embodiments, each mode of the drilling operation is assigned a pre-set protocol.

In some embodiments, the protocol is determined at the uphole system by a processor and the protocol is communicated to the downhole EM telemetry system using a downlink transmission system. The protocol may optionally be determined at the uphole system by user input in combination with the processor.

In a non-limiting example embodiment, a set of pre-set protocols are stored in the downhole EM telemetry system and determining the protocol for downhole data transmission comprises: based at least in part on one or more of a mode of drilling operation, the EM signals received, and the parameters measured, generating at the uphole system an index identifying one of the pre-set protocols stored in the downhole EM telemetry system; communicating the index to the downhole EM telemetry system using a downlink transmission system; and selecting one of the pre-set protocols stored in the downhole EM telemetry system based at least in part on the index communicated.

Some embodiments send periodic sweeps of EM sweep signals from the downhole EM telemetry system to the uphole system; detect the EM sweep signals at the uphole system and; based on the detected EM sweep signals, determine whether to adjust one or more of the protocol parameters. Such embodiments may operate to conserve electrical power at the downhole EM telemetry system by switching to a more energy-efficient protocol when the detected EM sweep signals indicate that the more energy-efficient protocol would provide adequate performance. As an example, a more energy-efficient protocol uses a higher frequency and/or fewer cycles per symbol to achieve a higher data rate, such that a given amount of data can be transmitted uphole in a shorter period of operation of the downhole EM telemetry system, and/or selects a frequency that can be received at the surface when transmitted using a lower transmission amplitude.

Another example aspect provides an EM telemetry system for communicating signals in a wellbore between a surface location and a downhole location. The EM telemetry system comprises: a signal generator configured to send a sweep of EM sweep signals at the downhole location; a receiver configured to receive the EM sweep signals at the surface location; and a processor coupled to the receiver and the signal generator, the processor configured to determine whether each of the EM sweep signals in the sweep is received at the receiver and, for each of the EM sweep signals received, record parameters of the EM sweep signal, the parameters comprising at least one of signal strength and signal-to-noise ratio, the processor further configured to determine a protocol for data transmission between the downhole location and the surface location, the protocol comprising protocol parameters including one or more of signal frequency, signal amplitude, and data encoding scheme; and a downlink transmission system coupled to the processor and the signal generator, the downlink transmission system communicating the determined protocol to the signal generator.

Another example aspect provides a downhole EM telemetry system comprising: a control circuit, an EM signal transmitter; a plurality of EM telemetry protocols; and one or more sensors. The control circuit is configured to determine a state of a drilling operation based on signals from the one or more sensors and to apply one of the plurality of EM telemetry protocols for transmission of data by the EM signal transmitter based on the determined state of the drilling operation.

Another example aspect provides a method for downhole electromagnetic (EM) telemetry in a downhole drilling operation. The method comprises, in response to determining that a drilling operation is in a quiet mode wherein a flow of drilling fluid is off and a drill string is not being rotated, configuring a downhole EM telemetry system to transmit data to an uphole system using a first protocol that transmits data at a first data rate. The method transmits first data using the first protocol. In some embodiments the first data is survey data. After transmitting the first data, the method configures the downhole EM telemetry system to transmit data to the uphole system using a second protocol that transmits data at a second data rate lower than the first data rate and transmits second data using the second protocol. In some embodiments, determining that the drilling operation is in the quiet mode comprises processing signals the one or more sensors at the downhole system. The sensors may include a fluid flow sensor and a rotation or direction sensor in some embodiments.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
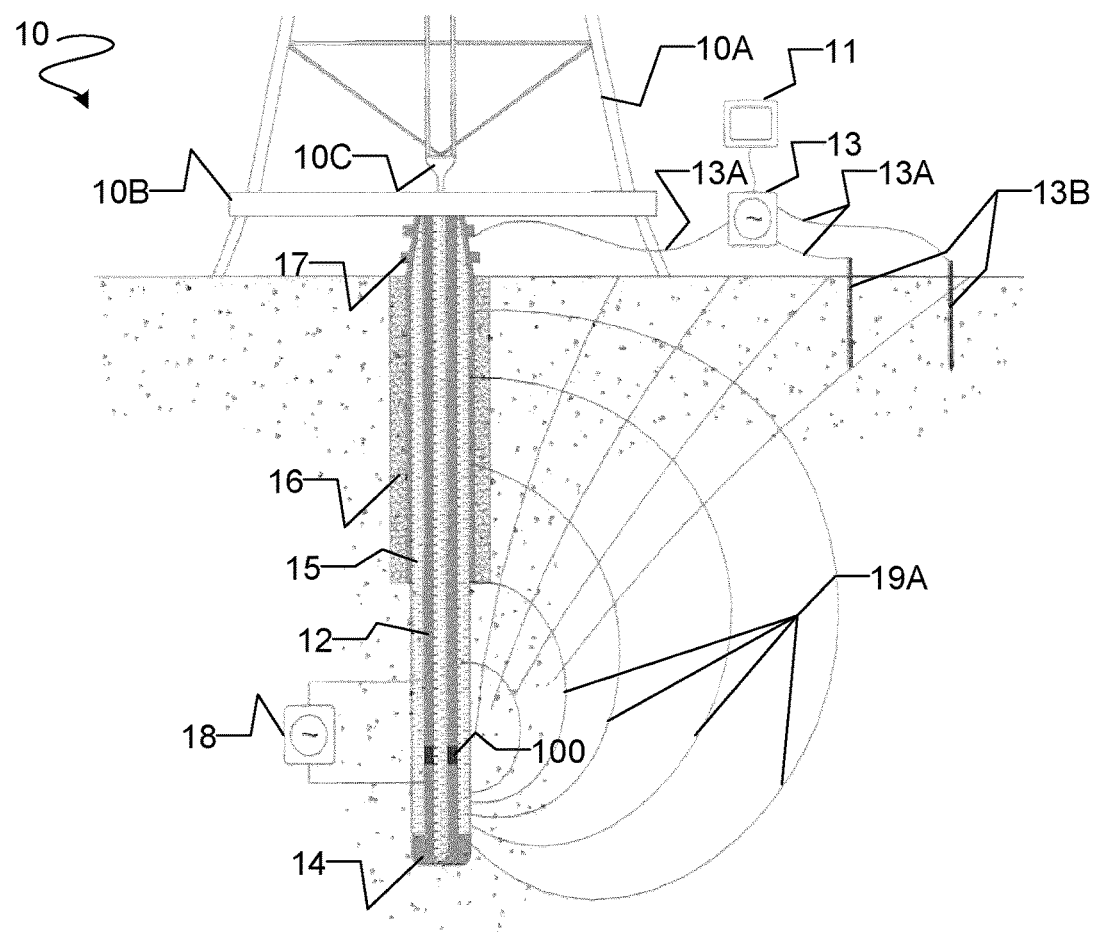
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the wellbore. A blow out preventer 17 is supported at a top end of the casing. The drill rig illustrated in FIG. 1 is an example only. The methods and apparatus described herein are not specific to any particular type of drill rig.

A gap sub 100 may be positioned, for example, at the top of the BHA. Gap sub 100 divides the drill string into two electrically-conductive parts that are electrically insulated from one another. The two parts form a dipole antenna structure. For example, one part of the dipole may be made of the BHA up to the electrically insulating gap and the other part of the dipole may be made up of the part of the drill string extending from the gap to the surface.

A very low frequency alternating current (AC) electrical signal 19A is generated by an EM telemetry signal generator 18 and applied across gap sub 100. The low frequency AC signal energizes the earth and creates an electrical field 19A which results in a measurable voltage differential between the top of drill string 12 and one or more grounded electrodes (such as ground rods or ground plates). Electrical signal 19A is varied in a way which encodes information for transmission by telemetry.

At the surface the EM telemetry signal is detected. Communication cables 13A transmit the measurable voltage differential between the top of the drill string and one or more grounded electrodes 13B located about the drill site to a signal receiver 13. The grounded electrodes 13B may be at any suitable locations. Signal receiver 13 decodes the transmitted information. A display 11 displays some or all of the received information. For example, display 11 may display received measurement while drilling information to the rig operator.

Whether or not EM telemetry transmissions from a downhole source can be reliably detected at the surface can depend on many factors. Some of these factors have to do with the characteristics of the underground formations through which the wellbore from which the electromagnetic telemetry is being performed passes. The electrical conductivity of the underground environment can play a major role in the effectiveness of electromagnetic telemetry (higher electrical conductivity, especially in the vicinity of gap sub 100, tends to attenuate EM telemetry signals). Both the average electrical conductivity of the underground environment as well as the way in which the electrical conductivity may vary from place to place can play significant roles.

Another factor that can affect electromagnetic telemetry is the depth from which electromagnetic telemetry is being performed. In general, electromagnetic telemetry signals become more highly attenuated as the depth from which the electromagnetic telemetry signals are being transmitted increases.

Another factor that may affect the success in receiving EM telemetry transmissions at the surface is the particular arrangement of signal detectors provided at the surface (e.g. the particular arrangement of grounding rods and other apparatus used at the surface as well as the sensitivity of the circuitry used to detect EM telemetry signals).

Another factor that can affect the effectiveness of EM telemetry transmissions is whether and how much drilling fluid is used (e.g. underbalanced drilling may use less and/or less dense drilling fluids; in air-based underbalanced drilling, the wellbore may be air-filled), the nature of drilling fluid being used (whether the drilling fluid is oil-based or water-based), and the specific characteristics of any drilling fluid being used.

Other factors include: whether or not the wellbore is cased and, if so, how deep does the casing extend; and the inclination of the portion of the drill bore in which the EM telemetry signal generator is located. It is much more challenging to achieve effective EM telemetry transmission from a cased horizontal wellbore than from an uncased vertical wellbore.

Another factor that can affect the success of EM telemetry signal transmissions is the drilling activity that is occurring at the time of the transmissions. For example, drilling often has a number of phases. In one phase (which typically includes the time at which a new section of drill string is being added or taken off of the drill string), the bore hole is quiet. Drilling fluid is not being pumped through the drill string "pump off". At other phases of the drilling operation, drilling fluid is being pumped through the drill string. Active drilling may include different modes of operation. In some modes of operation, the entire drill string is rotating as drilling progresses. In another "sliding" mode of operation, the drill bit is rotated by a downhole mud motor and the drill string is not rotated except as is necessary or desirable to steer the direction in which the drill bit is progressing. Which of these modes is occurring can affect EM telemetry by creating electrical noise and the like.

The combination of all the above factors creates a challenging environment for EM telemetry, especially where it is desired to optimize the EM telemetry to conserve electrical power and to maximize data throughput, where desired.

In situations where EM telemetry is more difficult, for example because of factors such as one or more of the above (and most typically a combination of several of the above), one can adjust the nature of the EM telemetry signals to improve the reliability of the EM telemetry channel. The characteristics of EM telemetry signals themselves can affect their successful transmission to the surface. One characteristic that has particular significance is the frequency at which the EM telemetry signals alternate in polarity and/or magnitude.

In general, lower-frequency-EM telemetry signals can be successfully transmitted from deeper locations than higher frequency-EM telemetry signals. For this reason, EM telemetry signals typically have very low frequencies. For example, EM telemetry signals generally have frequencies in the band below 24 Hertz. For example, EM telemetry signals according to some embodiments of the invention have frequencies in the range of about 1/10 Hertz to about 20 Hertz. The exact endpoints of these ranges are not critically important.

One advantage of the use of higher frequencies for EM telemetry is that the rate at which data can be encoded in higher-frequency-EM telemetry signals is greater than the rate at which the data can be encoded in lower-frequency-EM telemetry signals. Consequently, there is a trade-off between increasing the likelihood that EM signals can be successfully transmitted from a given depth by using very low frequencies and maintaining an increased data rate by using higher frequencies. Furthermore, if the frequency is too high, then the EM signals will be so strongly attenuated that no practical detector could pick them up at the surface.

Selection of carrier frequency for EM telemetry signals can have consequences beyond the amount of time required to transmit a certain amount of data to the surface. For example, transmitting at higher frequencies may significantly affect the amount of electrical power required to transmit a certain amount of data. One reason for this is that if data can be transmitted quickly, then, after the data has been transmitted (or in other periods during which it is not necessary to be transmitting data), certain circuits may be shut down to conserve electrical power. In addition, since the electrical impedance seen by an EM telemetry transmitter is somewhat frequency dependent, the amount of electrical power required to sustain an EM telemetry signal is also frequency dependent to some degree. On the other hand, higher frequencies are attenuated more strongly than lower frequencies and so higher frequency signals may need to be transmitted at higher amplitudes (thereby requiring more electrical power).

Another factor that influences the success of EM telemetry transmissions is the amplitude of the EM telemetry signals. Increased amplitude signals are easier to detect at the surface. However, the amplitude of EM telemetry signals may be limited by the capabilities of the downhole EM telemetry transmitter. For example, if the EM telemetry transmitting circuits can deliver only up to a maximum electrical current, then the amplitude of the EM telemetry signal will also be limited.

Other limits are imposed by the maximum voltage that can be imposed by the EM telemetry transmitter on the downhole antenna elements. The voltage of an EM telemetry signal may be limited by the nature of the EM telemetry signal generator as well as its power source. In some cases, the voltage may be limited by design to being below a threshold voltage for safety reasons. For example, in some embodiments, the voltage may be limited to a voltage of 50 Volts or less in order to reduce the likelihood that personnel who are handling the EM telemetry signal generator at the surface could be exposed to electrical shocks and/or to reduce the likelihood that the EM signal generator could serve as an ignition source.

The voltage that may be applied across the EM telemetry antenna elements may also depend on the characteristics of the gap. Typically, for a longer gap, a larger voltage may be applied without exceeding the electrical current capabilities of the EM telemetry signal generator. In addition to the above, increasing the amplitude of EM telemetry signals generally results in increased electrical power consumption. It is therefore desirable not to transmit EM telemetry signals that have amplitudes much greater than necessary.

The encoding scheme used to transmit EM telemetry signals can also play a role in the success with which the EM telemetry signals can be received. For example, if the encoding scheme is such that it encodes information by, at least in part, transmitting EM telemetry signals of different amplitudes, then it may be necessary for all of the different amplitudes, which are part of the encoding scheme, to be detectable at the surface for the EM telemetry transmission to be successfully received. If only some of the amplitudes are received at the surface, it may not be possible to recover the transmitted information at the surface.

As another example, different encoding schemes may use different numbers of cycles to encode symbols for transmission. For example, in low-noise environments, one may be able to successfully transmit EM telemetry symbols using an encoding scheme which transmits one symbol in two cycles of the EM telemetry signal. In higher noise environments, it may be desirable or necessary to use an encoding scheme which transmits one symbol in three or more cycles of the EM telemetry signal.

One aspect of the present invention provides methods and systems for optimizing EM telemetry by automatically selecting or assisting a user in the selection of appropriate EM telemetry parameters which may include one or more of: EM telemetry signal carrier frequency, EM telemetry signal amplitude, and EM telemetry signal data encoding scheme.

Apparatus and methods according to some example embodiments of this invention are configured to perform and/or, when in use, are operated to perform one or more of the following (in any combination):

conduct measurements to evaluate the effectiveness of EM telemetry transmission at different frequencies and use the obtained information to optimize EM telemetry transmission for one or more of data throughput and electrical power conservation.

detect a current mode of drilling and automatically switch among one or more sets of EM telemetry parameters based at least on the detected drilling mode.

select and/or recommend selection of a set of EM telemetry parameters based at least in part on a remaining amount of electrical power.

transmit certain data using two or more different EM telemetry carrier frequencies (either simultaneously or at different times).

In some embodiments, frequency sweeps are periodically transmitted from a downhole EM telemetry signal generator (e.g. once every few minutes to once every few hours). A frequency sweep may be triggered by time, an event (e.g. onset of a pump-off condition) or combinations thereof. Here, 'periodically' does not require that there is a fixed time between frequency sweeps. The time may vary somewhat. Frequency sweeps may be conducted often enough to detect significant changes in EM telemetry conditions as a downhole EM telemetry transmitter is moved along an advancing wellbore.

A frequency sweep is an electromagnetic telemetry transmission which transmits at different frequencies at different times. While it is not always advantageous to do so, in some cases, two or more frequencies are transmitted simultaneously. Transmitting only a few frequencies at the same time (e.g. 2 to 3 frequencies) has the advantages of allowing higher power to be allocated to each frequency (while staying within the current/voltage capabilities of an EM signal generator) as well as making it easier to detect signals at the different frequencies at the surface. Differential attenuation and phase shifts between different frequencies transmitted through the EM telemetry signal path can make separating a received signal into different frequency components difficult.

Figure 2:
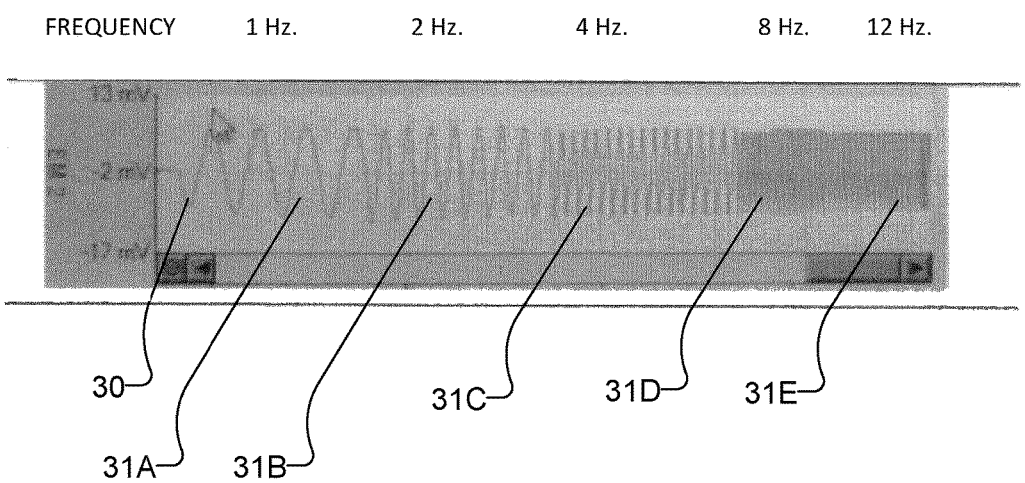
FIG. 2 shows an example of a sweep signal.
Figure 3:
FIG. 3 shows an example of a sweep signal detected at the surface.

The sweep may cover an entire range of frequencies that the EM telemetry system is capable of generating or, as described further below, may transmit only a subset of such frequencies in some embodiments. FIG. 2 shows an example of a sweep 30. FIG. 3 shows an example of a sweep signal detected at the surface.

Frequency sweep 30 shows that EM telemetry signals having a first, lower frequency, are transmitted in a first time period 31A, EM telemetry signals of other frequencies are transmitted in subsequent time periods 31B, 31C, 31D, and 31E.

It can be seen in FIG. 3 that the amplitude of the received signals drops off quickly with frequency to the point that the highest frequency signal is not successfully received. One advantage to transmitting frequencies in a frequency sweep one at a time is that the received signal may be displayed to a user in a way that clearly shows the amount of attenuation at different frequencies and whether or not a usable signal is being received at each frequency. FIG. 3 is an example of one possible display. This, in turn, allows more confidence in the selection of a frequency for EM signal transmission.

An example EM telemetry system has a frequency range of $\frac{1}{10}$ Hertz to 16 Hertz in a number of steps. For example, the system may be configured to be capable of transmitting EM telemetry signals at $\frac{1}{10}$ Hertz, $\frac{1}{2}$ Hertz, 1 Hertz, 2 Hertz, 4 Hertz, 8 Hertz, 12 Hertz, and 16 Hertz. A sweep may consist of a sequence of transmissions at these different frequencies. Each transmission may last for a given time, a given number of cycles, etc. In some embodiments, each frequency is transmitted for the same length of time.

The different frequency transmissions do not need to occur in any particular order. They may be transmitted in order of: higher frequencies to lower frequencies; or lower frequencies to higher frequencies; or other arrangements that are not necessarily in frequency-order. Transmitting in order of lower frequencies to higher frequencies has the advantage that lower frequencies are, in general, more readily received at the surface than higher frequencies. Consequently, starting a sweep at lower frequencies allows surface equipment to ensure that it is detecting the EM telemetry at the beginning of the sweep. The surface equipment can then detect the quality of transmission at successively higher frequencies.

Downhole electromagnetic telemetry equipment may be configured to generate sweeps at specified times and/or during specified phases of the drilling operation. For example, when a "pump off" condition (also called a "flow off" condition) is detected (a pump off condition may be detected, for example, by a flow sensor or other sensor associated with the downhole electromagnetic telemetry system), the EM telemetry system may automatically generate a sweep. The sweep may be generated, for example, a few seconds (e.g. 10 to 50 seconds, in an example embodiment 30 seconds) after the pump-off condition commences. A sweep may be transmitted automatically, every time the downhole EM telemetry system detects that the bore is quiet (both rotation and flow are off).

Surface equipment may detect some or all of the frequencies transmitted in the sweep. For each of the detected frequencies, the surface equipment may measure various factors such as signal strength, signal-to-noise ratio, and the like.

Based at least in part upon analysis of the received sweep signals, the system may set the downhole EM telemetry system to transmit data using a specified EM telemetry protocol (a specified set of EM telemetry parameters) and/or selectively change one or more EM telemetry parameters. A protocol may, for example, specify: one or more EM telemetry carrier frequencies and/or one or more specified EM telemetry signal amplitudes and/or one or more EM telemetry data encoding schemes.

The location(s) where the determination is made as to what protocol will be used by the downhole EM telemetry signal generator to transmit data may vary in different embodiments. In some embodiments, the determination is made by a computer system located at the surface, either by applying algorithms, such as the algorithms described below, or by applying algorithms in combination with human input. The determination may then be transmitted by some form of downlink telemetry to the downhole EM telemetry system. In some embodiments, the downhole EM telemetry system stores a set of pre-determined protocols and the downlink telemetry transmits an index identifying one of the predetermined protocols for use. In other embodiments, the downlink telemetry transmits EM telemetry parameters for the protocol to be used.

The downlink transmission may be by EM telemetry but may also or instead be transmitted using another telemetry type. Example alternative telemetry types that may be used for the downlink telemetry include: mud pulse telemetry, drill string acoustic telemetry, or telemetry performed by operating the drilling equipment (e.g. by rotating the drill string and/or turning on or off the flow of drilling fluid or regulating the flow of drilling fluid in a pattern detectable by sensors at the downhole EM telemetry signal generator).

In other embodiments, the uphole system may transmit results of the sweep to the downhole EM telemetry system. A processor at the downhole EM telemetry system may apply an algorithm to determine a protocol to use for EM telemetry based on the results of the sweep.

The protocol may be selected based on:
the set of one or more frequencies and amplitudes that can be received at the surface under current operating conditions; and/or,
a desired data rate for certain data (for example, it may be desired to transmit "tool face" information—information specifying the current orientation of a drill bit—using a high data rate such that the information may be received at the surface with low latency); and/or,
limits imposed by a desire to conserve electrical power and/or an available reserve of electrical power.

For example, in a particular case it may be desired to transmit tool face information to the surface quickly. From the sweep, the system may have determined that no reliably detectable signal is received at the surface for transmission frequencies of 12 Hertz or 16 Hertz. An 8 Hertz signal may be detectable within the limits of the surface equipment (which can typically detect signals of a few hundred microvolts at the surface). However, it may be necessary to use a large transmission voltage (corresponding to a relatively high power of transmission) in order to make the 8 Hertz signal detectable at the surface. A 2 Hertz signal may be detectable at the surface with a more moderate EM signal transmission amplitude. The system may balance the desirability of having rapid transmission of the tool face data to the surface against the cost in terms of power usage of transmitting that data using an 8 Hertz carrier frequency.

In another example embodiment, some available EM telemetry protocols use transmissions at two or more frequencies. The results of a sweep may be applied in such embodiments to ascertain whether or not to use such protocols (e.g. if no two suitable frequencies are available, then such protocols may not be used) and, if so, which two or more frequencies to use for the selected protocol. For example, in a case where a sweep shows that signals at both 16 Hz and 12 Hz are cleanly received at the surface then a dual-frequency protocol may use frequencies of 12 Hz and 16 Hz. In another case, where the only available frequency that can be reliably received at the surface is ½ Hz, then a single-frequency protocol using ½ Hz signals may be used.

In some embodiments, the system determines a cost per bit of different available frequency/amplitude combinations where the cost is expressed in terms of power consumption. Different types of data may have different values. For example, tool face information may be transmitted at a higher data rate up to a threshold cost per bit whereas other information which is less important to receive quickly may have a lower value and be transmitted using a protocol which has a lower cost per bit.

In some embodiments, one or more EM telemetry parameters are incrementally adjusted based upon results of a sweep. For example, if a sweep signal is received very strongly at the surface, then:
  a carrier frequency of the EM telemetry signal may be increased; and/or
  a data transmission protocol which yields a higher data rate at the same or a different frequency may be switched to; and/or
  an amplitude (voltage) of the EM telemetry signal may be reduced.

The opposite adjustment(s) may be made where a received sweep signal is weak. Each time a sweep is conducted the system may decide whether to increase or decrease one or more of these parameters in an incremental way.

In some embodiments, the system is configured to first adjust a frequency to obtain an EM telemetry signal that can be effectively received. The system may start from a current frequency and drop the frequency stepwise until reception occurs. If this does not work, then the system may boost the amplitude of the EM telemetry signals up to a limit in order to attempt to find the combination of frequency and signal strength that will succeed in transmitting the signal.

Figure 4:
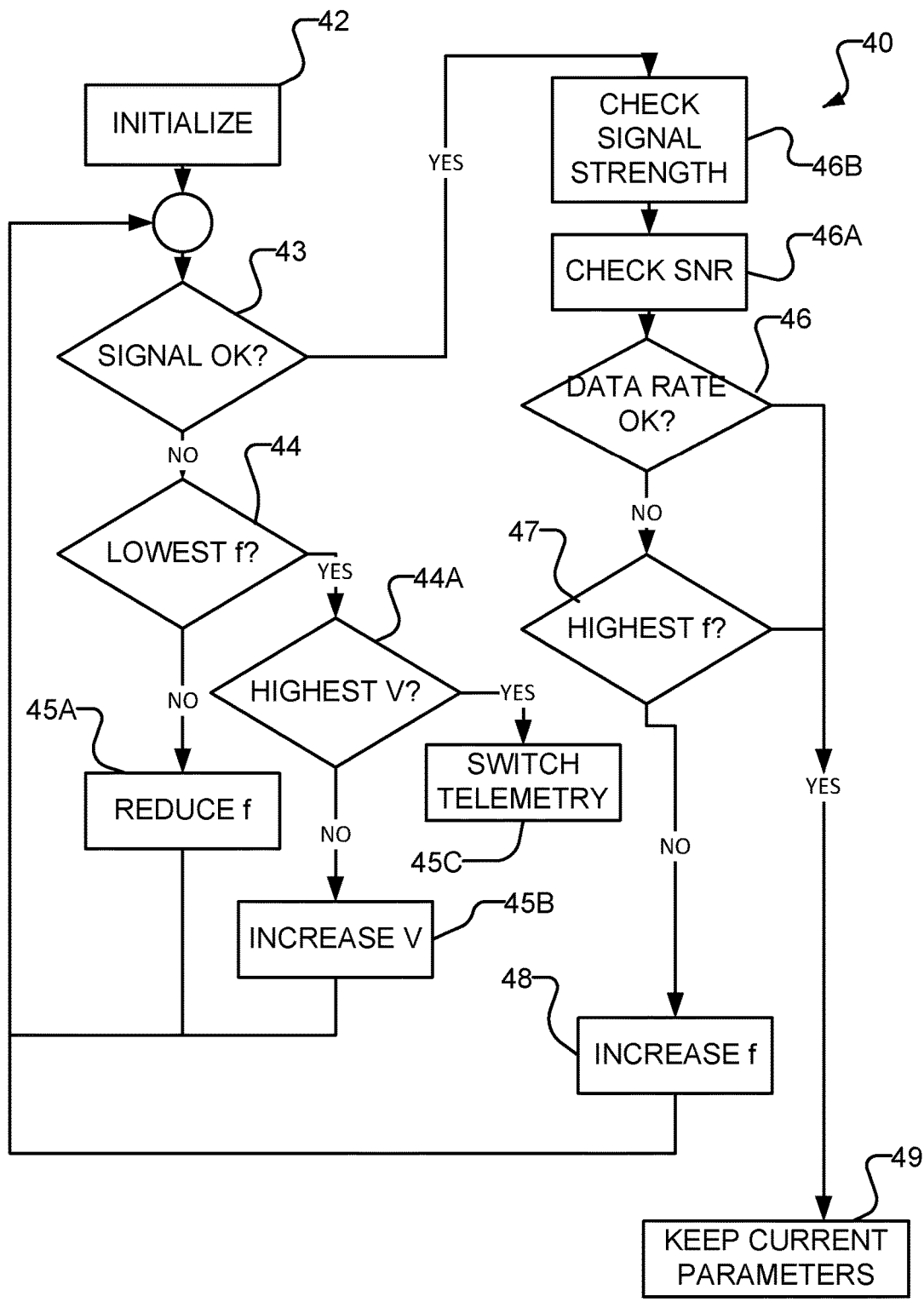
FIG. 4 is a flow chart illustrating an example method for adjusting EM telemetry parameters.

FIG. 4 shows a flow chart illustrating a method 40 according to one example embodiment. In block 42, the system is initialized. An EM signal transmitter is initially set to a default frequency, for example, 12 Hertz or some other frequency which represents a desired operating frequency. Block 43 checks to see whether reception of the signal is good. If not, block 44 determines whether the frequency can be reduced. If so, block 45A drops the frequency to a lower frequency, e.g. 4 Hertz, and the system returns to block 43 to test whether signal quality is good.

If block 44 determines that no further frequency reduction is possible, then the method proceeds to block 44A which checks to see if the voltage (current) of the EM telemetry signal can be increased. In some embodiments, block 44A bases the determination on available battery power. In other embodiments, a number of voltage settings are available and block 44A determines whether or not the system is already in the highest voltage (current) setting. If not, block 45B increases the voltage to the next level and the method returns to block 43. If no voltage increase is possible, then block 45C indicates a change in telemetry type (for example, the system may switch over to mud pulse telemetry).

It can be seen that, if the signal quality is not acceptable, then method 40 will repeatedly switch to lower frequencies until the lowest available frequency is selected and will then try to increase signal amplitude until the highest available signal amplitude is selected. If the signal quality is still unacceptable, then method 40 switches to an alternative telemetry type (or takes an alternative action such as quitting).

If block 43 determines that the signal quality is acceptable, then method 40 proceeds to block 46. Block 46 determines whether a data rate is acceptable. Block 46 may base its determination in part on the nature of the data available to be transmitted (e.g. whether the data is high priority or low priority for transmission) as well as a predetermined minimum data rate. If block 46 determines that the data rate is acceptable, then method 40 proceeds to block 49 which keeps the current EM telemetry parameters. Otherwise, method 40 proceeds to block 47 which checks to see whether the frequency can be increased. In some embodiments, block 46 can direct execution to block 47 only where the predetermined minimum data rate has been changed since the last time block 46 was executed. In such embodiments, where the minimum data rate has not been changed then block 46 may proceed to block 49.

In some embodiments, measurements of signal to noise ratio (SNR) and/or received signal strength are applied to determine available data rates. For example, if SNR is low, then data rate may be limited below a data rate that could be achieved for a higher SNR. If received signal power is low, then the data rate may also be limited (for example a transmission protocol using more cycles per bit may be required if received signal power is low). FIG. 4 shows blocks 46A and 46B which evaluate SNR and received signal power. The decision in block 46 and/or the available frequencies in block 47 may be determined with reference to the results obtained in blocks 46A and/or 46B. Block 46 and/or 47 may comprise looking up suitable data rates and/or transmission frequencies corresponding to the SNR and/or signals strength detected in blocks 46A and 46B. In some embodiments, such lookup operations also use the current transmission parameters—e.g. frequency and transmit powers to look up appropriate data rate and/or frequencies.

If block 47 determines that the frequency can be increased, method 40 proceeds to block 48 which increases the frequency to be used for EM telemetry. In some embodiments, block 48 may be executed enough times to increase the frequency to 16 Hz or even higher.

Figure 5:
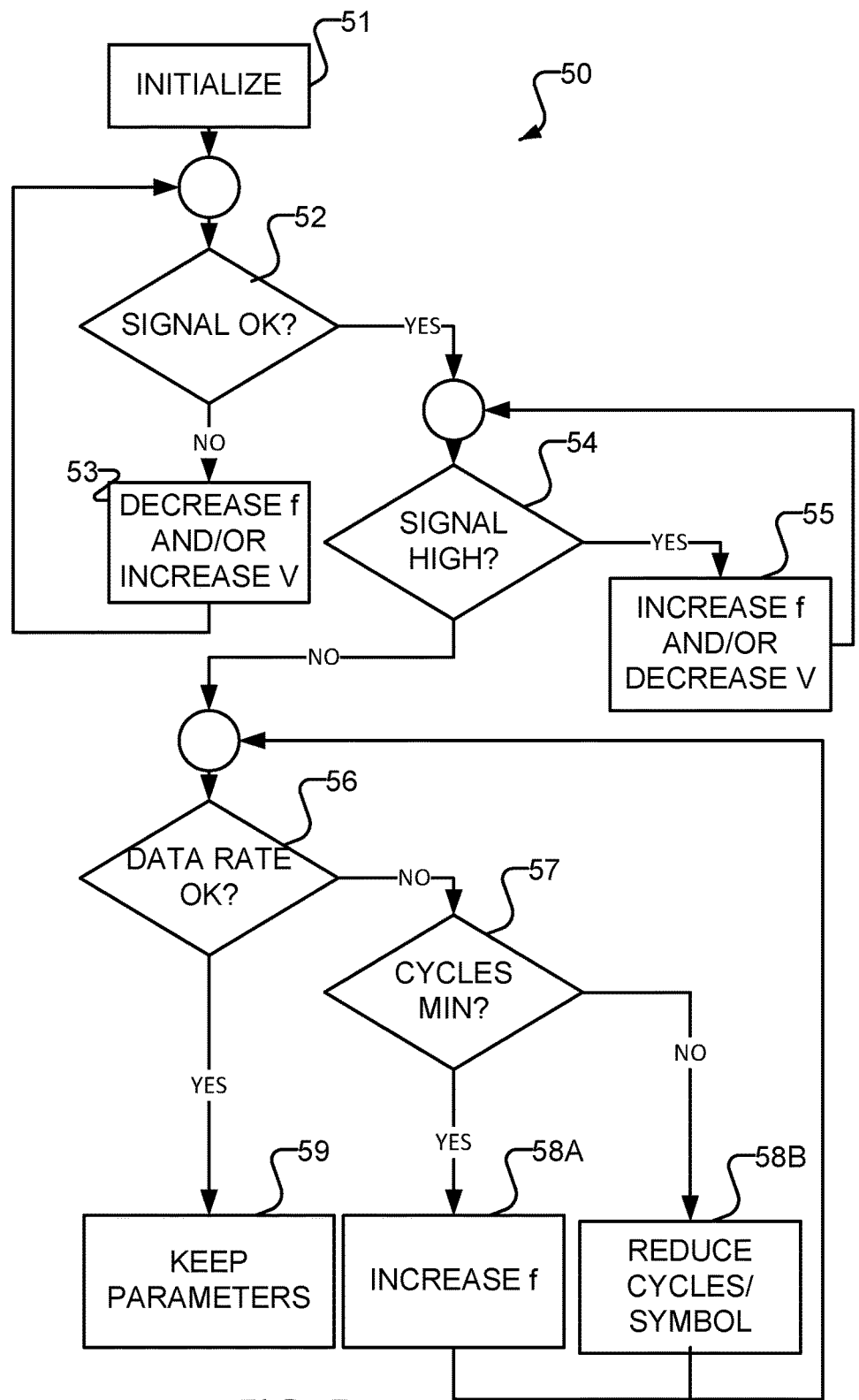
FIG. 5 is a flow chart illustrating another example method for adjusting EM telemetry parameters.

FIG. 5 shows a method 50 according to a further alternative embodiment of the invention which includes additional steps for adjusting the signal transmission protocol. In FIG. 5, block 52 determines whether a received signal is sufficiently strong. Block 52 may, for example, comprise determining a bit energy (which may be given by a product of bit duration and received signal power). If the received signal is not strong enough (e.g. has a bit energy below a threshold), block 53 decreases frequency of the transmitted signal and/or increases amplitude of the transmitted signal. Block 53 may, for example, work as shown in blocks 44 to 45C of method 40. In some embodiments, block 53 first attempts to achieve an acceptable received signal by decreasing frequency and then increasing signal amplitude.

If block 52 determines that signal quality is acceptable, then block 54 determines whether strength of the received signal is unnecessarily high. If so, then block 55 is executed. Block 55 increases the frequency of the transmitted signals and/or reduces amplitude of the transmitted signals. Block 55 may operate similarly to block 53. Block 55 may work by first trying to reduce the amplitude of the transmitted signal and then trying to increase frequency of the transmitted signal or may do the reverse. In some embodiments, block 55 may operate by trying to increase frequency until a maximum frequency is reached.

If block 54 determines that signal strength is not excessive, then block 56 checks to see whether the data rate is acceptable. If not, then block 57 checks to see if the number of cycles per symbol could be reduced. In some embodiments, block 57 checks to see whether the number of cycles per symbol can be reduced without reducing bit energy below a threshold. If so, then the transmission protocol is changed to reduce the number of cycles per symbol in block 58B. Otherwise, the frequency is increased (if possible) in block 58A. If block 56 determines that the data rate is acceptable, then the current EM telemetry parameters are kept in block 59.

In some embodiments, the effectiveness, useful frequencies, and so on for EM telemetry may be readily predictable from experience in drilling previous wellbores under similar conditions. In such embodiments, it may be acceptable to inhibit sweeps for a certain portion of the drilling operation (where the EM telemetry characteristics can be readily predicted from previous experience). In such embodiments, for example, a sweep may be performed once every N pump off conditions (with N being an integer).

In an example embodiment, in a development well which is expected to have very similar characteristics to a previously drilled exploratory well or another previously-drilled development well, the downhole EM telemetry system may be configured to automatically select an EM telemetry protocol based on depth according to a predetermined schedule (depth may be determined, for example, by a reading from a pressure sensor). The EM telemetry system may periodically, but much more rarely than might otherwise be done, transmit a sweep to the surface. The detection of the sweep at the surface may be compared to expected readings and the result used to adjust a schedule of changing EM telemetry protocols with depth.

In some embodiments, the EM telemetry transmission frequency and/or other elements of the EM telemetry protocol are determined based at least in part on a current mode of drilling. For example, different EM telemetry protocols may be used depending upon whether there is pump off condition and, if not, whether drilling is being performed in a sliding mode or in a rotating mode at which the entire drill string is being rotated.

For example, under certain conditions EM telemetry may be performed at: 16 Hertz when the well is quiet (no flow "pump off" condition); 8 Hertz while drilling under sliding conditions; and 2 Hertz during "full on" drilling while the drill string is rotating. The specific frequencies used in different drilling modes may be different in other circumstances. These specific frequencies may, for example, be determined in part based on results of a sweep.

In an example embodiment, a maximum frequency to use is determined from information transmitted during a sweep. The maximum frequency may be used during times when the wellbore is quiet (no flow, no rotation of the drill string). Lower frequencies may automatically be selected for use when the drill string is active. Different frequencies may be used depending on whether the drill string is being operated in a sliding mode (flow on without significant rotation of the drill string) or in a full on drilling mode (flow on and the drill string is rotating). These different frequencies may be selected automatically. For example, sensor readings may be obtained which indicate whether drilling fluid is flowing and whether the drill string is rotating. Communication frequencies may be selected based on the sensor readings. A first frequency, F1, may be selected in the case of no flow and no rotation. A second frequency F2 may be selected in the case of flow but no rotation. A third frequency F3 may be selected in the case of flow and rotation. The frequency selected for use when a sliding mode is detected may be higher than the frequency selected for use when a full on drilling mode is detected. In some cases F1>F2>F3.

In some embodiments, more frequencies are used in some drilling modes than in others. For example, when the wellbore is quiet, two or more frequencies may be used to transmit data and during full on drilling only one frequency may be used to transmit data.

Embodiments of the invention may employ any suitable scheme for encoding data in an EM telemetry signal. One such scheme is QPSK (quadrature phase shift keying). Another scheme is BPSK (binary phase shift keying). A PSK (phase-shift keying) encoding scheme may use a number of cycles (at the current frequency) to transmit each symbol. The number of cycles used to transmit each symbol may be varied. For example, in low-noise environments, one may be able to successfully transmit EM telemetry symbols using two cycles per symbol. In higher noise environments, it may be desirable or necessary to use three cycles (or more) to transmit each symbol. In some embodiments, the number of cycles to be used to encode a symbol is selected based on a measured signal-to-noise ratio (SNR) in a recent sweep. Other encoding schemes include FSK (frequency-shift keying), QAM (quadrature amplitude modulation), 8ASK (8 amplitude shift keying), APSK (amplitude phase shift keying), etc. Schemes which use any suitable combinations of changes in phase, amplitude, timing of pulses and/or frequency to communicate data may be applied.

In some embodiments, different encoding schemes are automatically selected based on the drilling mode. For example, fewer cycles per symbol may be used for telemetry during pump off conditions than are used for telemetry during full on drilling. Since the current drilling mode is readily determined both at the downhole EM telemetry system and at the surface, it is not necessary to provide explicit communication between the downhole telemetry system and the surface to indicate that EM telemetry transmissions are using another EM telemetry protocol because a drilling mode has changed.

In some embodiments, the protocol used for EM telemetry is specified in a configuration file at the downhole EM telemetry system. Downhole sensors may provide readings to the EM telemetry system. For example, the downhole telemetry system may have access to readings from a rotation sensor (any sensor that detects rotation of the drill string) and a flow sensor that detects the flow of drilling fluid. Based on the outputs from these sensors, the EM telemetry system can determine whether the drill string is quiet (no rotation detected, no flow detected) or whether the drill string is operating in a sliding mode (no rotation detected but flow detected), or whether the drill string is operating in a full on drilling mode (both rotation and flow are detected). The downhole system may automatically switch between different configuration files depending upon the readings from the sensors.

Information explaining how the signal is encoded may be already known at the surface equipment or may be transmitted to the surface equipment from the downhole EM telemetry system. For example, the data transmission protocol may include a header with an ID included in the header that indicates which EM telemetry protocol (or which set of EM telemetry protocols) is being used to encode the data (and therefore, how the data should be decoded by the surface equipment). The header may be transmitted in an easy to decode format, such as, for example, BPSK.

In some embodiments, the downhole EM telemetry system automatically waits for a downlink signal after a sweep has been conducted. The downlink signal may, for example, specify an EM telemetry protocol to use. If a downlink signal is not detected, the downhole EM telemetry signal may automatically revert to a default 'worst case' protocol. The default protocol may, for example, specify a very low frequency, for example, less than ½ Hertz or less than 0.1 Hertz, or even as low as a few hundredths of a Hertz (in order to maximize the possibility that the transmitted signals will be received at the surface).

In some embodiments, the same data is transmitted by EM telemetry (either from the surface or from a downhole EM telemetry system or both) using both lower carrier frequencies and higher carrier frequencies. These signals may be transmitted in sequence or at the same time. If the higher frequency signal is successfully received at its destination, then it can be acted on without waiting until the lower-frequency signal has been received. One of the frequencies used may be an extra low frequency that is most likely to be detected under worst-case conditions. The other signal may be transmitted at a higher frequency.

For example, where a downhole EM telemetry system receives downlink data sent using a high-frequency EM telemetry signal, then the downhole EM telemetry system can configure itself according to commands in the downlink signal data without waiting for completion of the transmission of the same commands on the lower frequency signal.

Similarly, where a driller is waiting for data (e.g. toolface data) to proceed then, if the data sent using a high-frequency EM telemetry signal is successfully received from the downhole EM telemetry system, the driller does not need to wait to receive the same data by way of the lower-frequency EM telemetry transmission. As soon as the driller has received the required data, the driller may recommence drilling. In some embodiments, where the low frequency transmission is continuing at the time when the driller commences drilling, the low frequency transmission may be truncated in response to detecting rotation of the drill string.

In some embodiments, an EM telemetry protocol may specify that data to be transmitted by the downhole EM telemetry system should be split up and transmitted using different EM telemetry frequencies (either simultaneously or in a given sequence). Signals detected at the surface may be filtered to separate the different frequencies. A different filter may be provided for each frequency.

In some embodiments, where the system determines from the result of a sweep or otherwise that multiple EM telemetry frequencies are available to use, the system may be configured to simultaneously send data by EM telemetry using two or more different carrier frequencies. In cases where the priority is low-latency communication, higher priority data may be sent using the highest frequency and lower priority data may be sent using lower frequencies. At the surface, data received on different frequencies may be separated using suitable filters and then separately and simultaneously displayed, stored and/or otherwise processed. In cases where the priority is given to reliable communication, then higher priority data may be sent using one or more lower frequencies and lower priority data may be sent using higher frequencies.

In some embodiments, during flow off conditions when the well is quiet, data throughput may be increased to transmit certain data (e.g. logging or survey data) more quickly. Such data may be transmitted using an EM telemetry protocol that provides a higher data rate (at the possible cost of increased power consumption) to reduce the time required to transmit the data to the surface. After the survey data or a desired portion of the survey data has been transmitted, then the system may switch to an alternative EM telemetry protocol that provides reduced power consumption.

Some embodiments make use of other modes of telemetry in addition to EM telemetry. For example, mud pulse telemetry may be used to transmit downlink signals and/or to transmit uplink signals. This capability may be used to allow communication to or from the downhole EM telemetry system to be made reliably and yet provide at least one mode of communication which has a relatively low latency to achieve rapid response of the downhole EM telemetry system. For example, rapid changes in the behaviour of the downhole EM telemetry system, e.g. switching between configuration files, could be achieved very quickly using fast EM downlink telemetry. Data that is less time sensitive to be transmitted to the EM telemetry system may be transmitted by a slower, but possibly more reliable in all circumstances, mode of data transmission. Transmission by different modes may occur simultaneously (concurrently) or overlapping in time or may be done at different times.

In some embodiments, selection of the appropriate data transmission protocol is based at least in part on the current state of charge of downhole batteries powering the electromagnetic telemetry system.

In some embodiments, sweeps themselves are used to encode data. For example, the order in which the different frequencies are transmitted and/or the amplitudes at which the different frequencies are transmitted and/or the number of cycles of each different frequency transmitted may be varied in such a way as to encode data. This data may be received at the surface. This data may, for example, comprise: an encoding scheme that will be used for encoding transmitted data by way of EM telemetry; data to be transmitted (e.g. tool face data); data regarding the status of the downhole EM telemetry system or another downhole system; or the like.

In some embodiments, frequencies which are not likely to be received are omitted from a sweep. For example, once a wellbore has been drilled to a depth such that the highest frequencies in a sweep are no longer being received, the highest frequency or frequencies may be left out of the sweep to conserve time and power. In some embodiments, the highest frequencies are still transmitted once in every few sweeps or every other sweep or the like in case conditions have changed such that the highest frequencies are again able to be received. In another example embodiment, where there is electrical noise that renders a frequency unusable for EM telemetry or undesirable, then that frequency may be left out of the sweep.

Embodiments as described herein transmit EM signals with multiple frequencies from a downhole location. In addition to application in evaluating the most appropriate frequency to use for EM telemetry, such signals may also be applied to cause interference with EM telemetry in adjoining wells. Since directional drilling can be used to make wellbores that extend for long distances horizontally, an operator of a directional drilling rig may deliberately or inadvertently drill a wellbore that extends into a formation that the operator is not entitled to drill into (e.g. a formation on an adjacent lease). The technology described herein may be applied to generate EM signals that interfere with EM telemetry from such a rogue operator and prevent the drilling of a wellbore assisted by EM telemetry in the vicinity of a wellbore in which sweeps are being generated as described above.

In some embodiments, surface equipment includes filters configured to block frequencies other than those frequencies being used for data telemetry from downhole. Since the frequency or frequencies allocated for data telemetry may change from time to time, as described herein, the filters at the surface equipment may be re-set to pass the current data telemetry signal frequencies. This resetting may be performed automatically each time new data telemetry signal frequencies are selected.

In some embodiments, data telemetry signal frequencies are selected based in part on signal-to-noise ratio on different frequencies. Noise may come from drill rig equipment, telemetry in an adjacent well (by a rogue operator or otherwise) or other sources. In some embodiments, in response to identifying frequencies on which significant noise is present (e.g. noise exceeding a threshold and/or SNR lower than a threshold), a blocking filter is automatically configured at the surface equipment to block the noisy frequency(ies) and other frequencies are selected for data telemetry. Such noisy frequency(ies) may be identified in analyzing a received sweep signal as described above.

A sweep signal may be received at a location other than surface equipment. For example, a sweep signal sent by a first piece of downhole equipment may be detected by a second piece of downhole equipment spaced apart along the drill string from the first piece of downhole equipment. A sweep signal generated at one location may be received at two or more other locations. These possibilities facilitate a number of possible applications. One possible application is setting different EM telemetry parameters for communications to different endpoints. For example, a downhole probe may use one set of EM telemetry parameters (frequency(ies), data encoding scheme, etc.) for communication to surface equipment and another set of EM telemetry parameters for communication to another downhole probe. Each set of EM telemetry parameters may be selected based on received sweep signals according to methods as described herein.

A plurality of pieces of downhole equipment may be configured to generate sweep signals and to receive sweep signals generated by other pieces of downhole equipment. An application of this possibility is to map the hole for regions in which EM transmissions are strongly attenuated. For example, consider the case where there are several (e.g. 4 to 10 systems) spaced apart along the drill string, each capable of generating sweep signals and receiving sweep signals. When a zone of high EM signal attenuation is located between the two systems that are farthest downhole, the two farthest downhole systems may detect attenuated sweep signals from one another but the other systems may not detect the sweep signals from the farthest downhole system because of the high attenuation. Information regarding the locations of zones of high attenuation may be used to predict attenuation along the entire length of the wellbore. This information may be applied to selecting telemetry types (e.g. EM telemetry may be disabled for a system that is located in a zone of high attenuation and other telemetry types—e.g. mud pulse telemetry—may be used instead).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

INTERPRETATION OF TERMS

Unless the context clearly requires otherwise, throughout the description and the "comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back",, "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for downhole electromagnetic (EM) telemetry in a downhole drilling operation, the method comprising the steps of:
   determining a mode of the drilling operation;
   sending a set of EM sweep signals from a downhole EM telemetry system located at a downhole location to an uphole system located at a surface location, each of the EM sweep signals having a different frequency;
   determining whether each of the EM sweep signals is received at the uphole system and, for the EM sweep signals received, measuring parameters of the received EM sweep signals, the parameters comprising at least one of signal strength and signal-to-noise-ratio;
   based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and
   configuring the downhole EM telemetry system to transmit data to the uphole system using the protocol;
   wherein: the data encoding scheme comprises a number of cycles of EM signals to use for encoding symbols for transmission; and determining the protocol comprises setting the number of cycles to be used for encoding signals for transmission.

2. The method according to claim 1 wherein each mode of the drilling operation is assigned a pre-set protocol.

3. The method according to claim 1 wherein the protocol is determined based at least in part on one or more of a desired data rate and a desired power consumption.

4. The method according to claim 1 wherein the protocol is determined at the uphole system by a processor and the protocol is communicated to the downhole EM telemetry system using a downlink transmission system.

5. The method according to claim 4 wherein the protocol is determined at the uphole system by user input in combination with the processor.

6. The method according to claim 4 wherein the downlink transmission system comprises an EM telemetry system or a mud pulse telemetry system.

7. The method according to claim 1 wherein a set of pre-set protocols are stored in the downhole EM telemetry system and determining the protocol for downhole data transmission comprises:
   based at least in part on one or more of a mode of drilling operation, the EM signals received, and the parameters measured, generating at the uphole system an index identifying one of the pre-set protocols stored in the downhole EM telemetry system;
   communicating the index to the downhole EM telemetry system using a downlink transmission system; and
   selecting one of the pre-set protocols stored in the downhole EM telemetry system based at least in part on the index communicated.

8. The method according to claim 1 wherein the mode of drilling operation is determined using measurements obtained from downhole sensors.

9. The method according to claim 1, the method further comprising:
   periodically, sending sets of EM sweep signals from the downhole EM telemetry system to the uphole system; and
   detecting the EM sweep signals at the uphole system; and
   based on the detected EM sweep signals, determining whether to adjust one or more of the protocol parameters.

10. The method according to claim 1 wherein the data encoding scheme is one of quadrature phase shift keying (QPSK), binary phase shift keying (BPSK), phase-shift keying (PSK), frequency-shift keying (FSK), quadrature amplitude modulation (QAM), 8 amplitude shift keying (8ASK), and amplitude phase shift keying (APSK).

11. The method according to claim 1 comprising encoding information in the EM sweep signals and decoding the information from the received EM sweep signals.

12. The method according to claim 11 wherein encoding the information in the EM sweep signals comprises one or more of varying an order of the frequencies transmitted, varying a number of cycles of different frequencies transmitted, and modulating the frequencies transmitted in the EM sweep signals.

13. The method according to claim 11 wherein the encoded information comprises one or more of an encoding scheme for encoding data transmitted using the protocol, data relating to downhole conditions, and data relating to downhole systems.

14. The method according to claim 1 wherein sending the set of EM sweep signals comprises sending two or more of the EM signals concurrently.

15. A method for downhole electromagnetic (EM) telemetry in a downhole drilling operation, the method comprising the steps of:
   determining a mode of the drilling operation;
   sending a set of EM sweep signals from a downhole EM telemetry system located at a downhole location to an uphole system located at a surface location, each of the EM sweep signals having a different frequency;
   determining whether each of the EM sweep signals is received at the uphole system and, for the EM sweep signals received, measuring parameters of the received EM sweep signals, the parameters comprising at least one of signal strength and signal-to-noise-ratio;
   based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and
   configuring the downhole EM telemetry system to transmit data to the uphole system using the protocol;

wherein determining the protocol comprises:
a) selecting a frequency and an amplitude for the protocol for EM data transmission signals based at least in part on the received EM sweep signals; and
b) if EM signals of the frequency and amplitude are not properly received at the uphole system, modifying the protocol by reducing the frequency until the frequency is at a minimum acceptable frequency and, if EM signals of the minimum acceptable frequency and selected amplitude are not properly received at the uphole system, increasing the amplitude of the protocol.

16. The method according to claim 15 comprising, if EM signals of the minimum acceptable frequency and a maximum acceptable amplitude are not properly received at the uphole system, switching to an alternative telemetry system.

17. The method according to claim 15 comprising, if the EM signal of the minimum acceptable frequency and a maximum acceptable amplitude does not have at least a threshold acceptable data rate, reducing a number of cycles per symbol for the protocol.

18. The method according to claim 17 comprising determining the threshold acceptable data rate based at least in part on the nature of data available for transmission.

19. The method according to claim 15 further comprising:
checking if the EM signal has a strength that exceeds a threshold and, if so, increasing the frequency and/or decreasing the amplitude for the protocol.

20. The method according to claim 19 wherein the strength of the EM signal is determined based at least in part on a bit energy.

21. The method according to claim 20 comprising reducing the number of cycles per symbol for the protocol without reducing the bit energy below a threshold value.

22. A method for downhole electromagnetic (EM) telemetry in a downhole drilling operation, the method comprising the steps of:
determining a mode of the drilling operation;
sending a set of EM sweep signals from a downhole EM telemetry system located at a downhole location to an uphole system located at a surface location, each of the EM sweep signals having a different frequency;
determining whether each of the EM sweep signals is received at the uphole system and, for the EM sweep signals received, measuring parameters of the received EM sweep signals, the parameters comprising at least one of signal strength and signal-to-noise-ratio;
based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and
configuring the downhole EM telemetry system to transmit data to the uphole system using the protocol;
wherein the set of EM sweep signals comprises a subset of a set of predetermined EM sweep signals and the method comprises sending only the subset of EM sweep signals from the downhole EM telemetry system to the uphole system.

23. A method for downhole electromagnetic (EM) telemetry in a downhole drilling operation, the method comprising the steps of:
determining a mode of the drilling operation;
sending a set of EM sweep signals from a downhole EM telemetry system located at a downhole location to an uphole system located at a surface location, each of the EM sweep signals having a different frequency;
determining whether each of the EM sweep signals is received at the uphole system and, for the EM sweep signals received, measuring parameters of the received EM sweep signals, the parameters comprising at least one of signal strength and signal-to-noise-ratio;
based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and
at the downhole EM telemetry system, waiting for a downlink transmission from the uphole system after sending the set of EM sweep signals and if the downhole EM telemetry system does not receive the downlink transmission within a pre-determined period, applying a default pre-determined protocol; and,
configuring the downhole EM telemetry system to transmit data to the uphole system using the default pre-determined protocol or the determined protocol.

24. A method for downhole electromagnetic (EM) telemetry in a downhole drilling operation, the method comprising the steps of:
determining a mode of the drilling operation;
sending a set of EM sweep signals from a downhole EM telemetry system located at a downhole location to an uphole system located at a surface location, each of the EM sweep signals having a different frequency;
determining whether each of the EM sweep signals is received at the uphole system and, for the EM sweep signals received, measuring parameters of the received EM sweep signals, the parameters comprising at least one of signal strength and signal-to-noise-ratio;
based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and
configuring the downhole EM telemetry system to transmit data to the uphole system using the protocol;
wherein the set of EM sweep signals comprises a first EM sweep signal having a lower frequency and a second EM sweep signal having a higher frequency and if the second EM signal is received by the uphole system, the protocol is determined based only on the second EM signal.

25. A method for downhole electromagnetic (EM) telemetry in a downhole drilling operation, the method comprising the steps of:
determining a mode of the drilling operation;
sending a set of EM sweep signals from a downhole EM telemetry system located at a downhole location to an uphole system located at a surface location, each of the EM sweep signals having a different frequency;
determining whether each of the EM sweep signals is received at the uphole system and, for the EM sweep signals received, measuring parameters of the received EM sweep signals, the parameters comprising at least one of signal strength and signal-to-noise-ratio;
based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and configuring the downhole EM telemetry system to transmit data to the uphole system using the protocol;

wherein the protocol is determined at least in part based on a current state of charge of downhole batteries powering the downhole EM telemetry system.

26. A method for downhole electromagnetic (EM) telemetry in a downhole drilling operation, the method comprising the steps of:

determining a mode of the drilling operation;

automatically sending a set of EM sweep signals from a downhole EM telemetry system located at a downhole location to an uphole system located at a surface location, each of the EM sweep signals having a different frequency, the set of EM sweep signals being sent at a predetermined time after onset of a pump off condition;

determining whether each of the EM sweep signals is received at the uphole system and, for the EM sweep signals received, measuring parameters of the received EM sweep signals, the parameters comprising at least one of signal strength and signal-to-noise-ratio;

based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and configuring the downhole EM telemetry system to transmit data to the uphole system using the protocol.

27. A method for downhole electromagnetic (EM) telemetry in a downhole drilling operation, the method comprising the steps of:

determining a mode of the drilling operation;

sending a set of EM sweep signals from a downhole EM telemetry system located at a downhole location to an uphole system located at a surface location, each of the EM sweep signals having a different frequency;

determining whether each of the EM sweep signals is received at the uphole system and, for the EM sweep signals received, measuring parameters of the received EM sweep signals, the parameters comprising at least one of signal strength and signal-to-noise-ratio;

determining from the measured parameters of the received EM sweep signals a maximum frequency to use for EM telemetry and using the maximum frequency when the mode of the drilling operation is a mode in which the drill string is not rotating and fluid is not being flowed in the drill string;

based at least in part on: the mode of drilling operation, the EM sweep signals received, and the parameters measured, determining a protocol for downhole data transmission, the protocol specifying protocol parameters including one or more of signal frequency, signal amplitude, and data encoding scheme; and configuring the downhole EM telemetry system to transmit data to the uphole system using the protocol.

28. The method according to claim 27 comprising automatically selecting one or more lower frequencies for use when the mode of the drilling operation is a mode in which the drill string is rotating or fluid is being flowed through the drill string or both.

29. The method according to claim 27 comprising using different frequencies for EM telemetry transmissions depending on whether the mode of the drilling operation corresponds to a sliding mode in which fluid is being flowed through the drill string without significant rotation of the drill string or a full on drilling mode in which fluid is being flowed through the drill string with rotation of the drill string.

30. The method according to claim 27 comprising determining the mode of the drilling operation based on sensor readings which indicate whether drilling fluid is flowing and whether the drill string is rotating.

31. The method according to claim 27 comprising: selecting a first frequency, F1, for use in the case where the mode of the drilling operation corresponds to no flow of fluid in the drill string and no rotation of the drill string; selecting a second frequency, F2, for use in the case where the mode of the drilling operation corresponds to flow of fluid in the drill string and no rotation of the drill string; and selecting a third frequency, F3, for use in the case where the mode of the drilling operation corresponds to flow of fluid in the drill string and rotation of the drill string; wherein: F1>F2>F3.

32. An electromagnetic (EM) telemetry system for communicating signals in a wellbore between a surface location and a downhole location, the EM telemetry system comprising:

a signal generator configured to send a set of EM sweep signals at the downhole location;

a receiver configured to receive the EM sweep signals at the surface location; and a processor coupled to the receiver and the signal generator, the processor configured to determine whether each of the EM sweep signals in the set is received at the receiver and, for each of the EM sweep signals received, record parameters of the EM sweep signal, the parameters comprising at least one of signal strength and signal-to-noise ratio;

the processor further configured to determine a mode of the drilling operation;

the processor further configured to determine a protocol for data transmission between the downhole location and the surface location based at least in part on the mode of the drilling operation, the EM sweep signals received, and the parameters recorded, the protocol comprising protocol parameters including one or more of signal frequency, signal amplitude, and data encoding scheme; and a downlink transmission system coupled to the processor and the signal generator, the downlink transmission system configured to communicate the determined protocol to the signal generator;

wherein the protocol specifies a number of cycles of EM signals to be used to encode symbols for transmission.

33. The EM telemetry system according to claim 32 wherein the processor is configured to determine the protocol based at least in part on one or more of a desired data rate and a desired power consumption.

34. The EM telemetry system according to claim 32 wherein the processor is configured to receive user input and determine the protocol using at least in part the user input.

35. The EM telemetry system according to claim 32 wherein the processor is configured to determine the protocol by generating an index, the index identifying one of pre-set protocols stored in a controller, the controller coupled to the signal generator and the processor, and by communicating the generated index to the controller using the downhole transmission link, wherein the controller selects one of the pre-set protocols based on the index and communicates the selected pre-set protocol to the signal generator.

36. The EM telemetry system according to claim 35 wherein the processor is configured to determine the mode of drilling operation using measurements obtained from downhole sensors.

37. The EM telemetry system according to claim 32 wherein the signal generator is configured to send periodic sets of EM sweep signals to the receiver and the processor is configured to incrementally adjust one or more of the protocol parameters after every set of EM sweep signals.

38. The EM telemetry system according to claim 32 wherein the downlink transmission system comprises one of an EM telemetry system and a mud pulse telemetry system.

39. The EM telemetry system according to claim 32 wherein the signal generator is configured to encode information in the EM sweep signals.

40. The EM telemetry system according to claim 32 wherein the signal generator is configured to send two or more EM sweep signals concurrently.

41. An electromagnetic (EM) telemetry system for communicating signals in a wellbore between a surface location and a downhole location, the EM telemetry system comprising:
   a signal generator configured to send a set of EM sweep signals at the downhole location;
   a receiver configured to receive the EM sweep signals at the surface location; and
   a processor coupled to the receiver and the signal generator, the processor configured to determine whether each of the EM sweep signals in the set is received at the receiver and, for each of the EM sweep signals received, record parameters of the EM sweep signal, the parameters comprising at least one of signal strength and signal-to-noise ratio;
   the processor further configured to determine a mode of the drilling operation;
   the processor further configured to determine a protocol for data transmission between the downhole location and the surface location based at least in part on the mode of the drilling operation, the EM sweep signals received, and the parameters recorded, the protocol comprising protocol parameters including one or more of signal frequency, signal amplitude, and data encoding scheme; and
   a downlink transmission system coupled to the processor and the signal generator, the downlink transmission system configured to communicate the determined protocol to the signal generator;
   wherein the set of EM sweep signals comprises a subset of a predetermined set of EM sweep signals and the signal generator is configured to send the subset of EM sweep signals to the receiver.

42. An electromagnetic (EM) telemetry system for communicating signals in a wellbore between a surface location and a downhole location, the EM telemetry system comprising:
   a signal generator configured to send a set of EM sweep signals at the downhole location;
   a receiver configured to receive the EM sweep signals at the surface location; and
   a processor coupled to the receiver and the signal generator, the processor configured to determine whether each of the EM sweep signals in the set is received at the receiver and, for each of the EM sweep signals received, record parameters of the EM sweep signal, the parameters comprising at least one of signal strength and signal-to-noise ratio;
   the processor further configured to determine a mode of the drilling operation;
   the processor further configured to determine a protocol for data transmission between the downhole location and the surface location based at least in part on the mode of the drilling operation, the EM sweep signals received, and the parameters recorded, the protocol comprising protocol parameters including one or more of signal frequency, signal amplitude, and data encoding scheme; and
   a downlink transmission system coupled to the processor and the signal generator, the downlink transmission system configured to communicate the determined protocol to the signal generator;
   wherein the generator is configured to use a pre-determined default protocol for transmitting data to the surface location by EM telemetry if the processor does not communicate the protocol to the generator before a pre-determined time.

43. An electromagnetic (EM) telemetry system for communicating signals in a wellbore between a surface location and a downhole location, the EM telemetry system comprising:
   a signal generator configured to send a set of EM sweep signals at the downhole location;
   a receiver configured to receive the EM sweep signals at the surface location; and
   a processor coupled to the receiver and the signal generator, the processor configured to determine whether each of the EM sweep signals in the set is received at the receiver and, for each of the EM sweep signals received, record parameters of the EM sweep signal, the parameters comprising at least one of signal strength and signal-to-noise ratio;
   the processor further configured to determine a mode of the drilling operation;
   the processor further configured to determine a protocol for data transmission between the downhole location and the surface location based at least in part on the mode of the drilling operation, the EM sweep signals received, and the parameters recorded, the protocol comprising protocol parameters including one or more of signal frequency, signal amplitude, and data encoding scheme; and
   a downlink transmission system coupled to the processor and the signal generator, the downlink transmission system configured to communicate the determined protocol to the signal generator;
   wherein the set of EM sweep signals comprises a first EM sweep signal having a higher frequency and a second EM sweep signal having a lower frequency and wherein the processor is configured such that, if the first EM signal is received at the receiver, the processor determines the protocol based only on the first EM sweep signal.

44. An electromagnetic (EM) telemetry system for communicating signals in a wellbore between a surface location and a downhole location, the EM telemetry system comprising:
   a signal generator configured to send a set of EM sweep signals at the downhole location;
   a receiver configured to receive the EM sweep signals at the surface location; and
   a processor coupled to the receiver and the signal generator, the processor configured to determine whether each of the EM sweep signals in the set is received at the receiver and, for each of the EM sweep signals received, record parameters of the EM sweep signal, the parameters comprising at least one of signal strength and signal-to-noise ratio;

the processor further configured to determine a mode of the drilling operation;

the processor further configured to determine a protocol for data transmission between the downhole location and the surface location based at least in part on the mode of the drilling operation, the EM sweep signals received, and the parameters recorded, the protocol comprising protocol parameters including one or more of signal frequency, signal amplitude, and data encoding scheme; and a downlink transmission system coupled to the processor and the signal generator, the downlink transmission system configured to communicate the determined protocol to the signal generator;

wherein the processor is configured to determine the protocol based at least in part on a current state of charge of downhole batteries powering the signal generator.

45. A method for downhole electromagnetic (EM) telemetry in a downhole drilling operation, the method comprising the steps of:

periodically, sending a set of EM sweep signals from a downhole EM telemetry system located at a downhole location to an uphole system located at a surface location, each of the EM sweep signals having a different frequency;

determining whether each of the EM sweep signals is received at the uphole system and, for the EM sweep signals received, measuring parameters of the received EM sweep signals, the parameters comprising at least one of signal strength and signal-to-noise-ratio;

determining a mode of the drilling operation;

based at least in part on the EM sweep signals received, the parameters measured, and the mode of the drilling operation, determining whether to adjust one or more protocol parameters of a protocol for downhole data transmission, the protocol parameters including one or more of signal frequency, signal amplitude, and data encoding scheme; and configuring the downhole EM telemetry system to transmit data to the uphole system using the protocol, the method further comprising determining, based at least in part on the EM sweep signals received and the parameters measured, whether the signal strength exceeds a threshold, and, if the signal strength exceeds the threshold, increasing the signal frequency.

46. A method for downhole electromagnetic (EM) telemetry in a downhole drilling operation, the method comprising the steps of:

periodically, sending a set of EM sweep signals from a downhole EM telemetry system located at a downhole location to an uphole system located at a surface location, each of the EM sweep signals having a different frequency;

determining whether each of the EM sweep signals is received at the uphole system and, for the EM sweep signals received, measuring parameters of the received EM sweep signals, the parameters comprising at least one of signal strength and signal-to-noise-ratio;

determining a mode of the drilling operation;

based at least in part on the EM sweep signals received, the parameters measured, and the mode of the drilling operation, determining whether to adjust one or more protocol parameters of a protocol for downhole data transmission, the protocol parameters including one or more of signal frequency, signal amplitude, and data encoding scheme; and configuring the downhole EM telemetry system to transmit data to the uphole system using the protocol, the method further comprising determining, based at least in part on the EM sweep signals received and the parameters measured, whether the signal strength exceeds a threshold, and, if the signal strength exceeds the threshold, reducing the signal amplitude.

47. The method according to claim 46 comprising, if the signal strength exceeds the threshold, both reducing the signal amplitude and increasing the signal frequency.

48. A method for downhole electromagnetic (EM) telemetry in a downhole drilling operation, the method comprising the steps of:

periodically, sending a set of EM sweep signals from a downhole EM telemetry system located at a downhole location to an uphole system located at a surface location, each of the EM sweep signals having a different frequency;

determining whether each of the EM sweep signals is received at the uphole system and, for the EM sweep signals received, measuring parameters of the received EM sweep signals, the parameters comprising at least one of signal strength and signal-to-noise-ratio;

determining a mode of the drilling operation;

based at least in part on the EM sweep signals received, the parameters measured, and the mode of the drilling operation, determining whether to adjust one or more protocol parameters of a protocol for downhole data transmission, the protocol parameters including one or more of signal frequency, signal amplitude, and data encoding scheme; and configuring the downhole EM telemetry system to transmit data to the uphole system using the protocol;

wherein the data encoding scheme comprises a number of cycles of EM signals to use for encoding symbols for transmission; and wherein the method comprises adjusting the number of cycles to be used for encoding signals for transmission.

49. A method for downhole electromagnetic (EM) telemetry in a downhole drilling operation, the method comprising the steps of:

periodically, sending a set of EM sweep signals from a downhole EM telemetry system located at a downhole location to an uphole system located at a surface location, each of the EM sweep signals having a different frequency;

determining whether each of the EM sweep signals is received at the uphole system and, for the EM sweep signals received, measuring parameters of the received EM sweep signals, the parameters comprising at least one of signal strength and signal-to-noise-ratio;

determining a mode of the drilling operation;

based at least in part on the EM sweep signals received, the parameters measured, and the mode of the drilling operation, determining whether to adjust one or more protocol parameters of a protocol for downhole data transmission, the protocol parameters including one or more of signal frequency, signal amplitude, and data encoding scheme;

at the downhole EM telemetry system, waiting for a downlink transmission from the uphole system after sending the sweep signals and, if the downhole EM telemetry system does not receive the downlink transmission within a pre-determined period, applying default pre-determined protocol parameters for the protocol; and configuring the downhole EM telemetry system to transmit data to the uphole system using the protocol.

50. A method for downhole electromagnetic (EM) telemetry in a downhole drilling operation, the method comprising the steps of:

periodically, automatically sending a set of EM sweep signals from a downhole EM telemetry system located at a downhole location to an uphole system located at a surface location, each of the EM sweep signals having a different frequency and the EM sweep signals being sent at a predetermined time after onset of a pump off condition;

determining whether each of the EM sweep signals is received at the uphole system and, for the EM sweep signals received, measuring parameters of the received EM sweep signals, the parameters comprising at least one of signal strength and signal-to-noise-ratio;

determining a mode of the drilling operation;

based at least in part on the EM sweep signals received, the parameters measured, and the mode of the drilling operation, determining whether to adjust one or more protocol parameters of a protocol for downhole data transmission, the protocol parameters including one or more of signal frequency, signal amplitude, and data encoding scheme; and configuring the downhole EM telemetry system to transmit data to the uphole system using the protocol.

* * * * *